(12) United States Patent
Vinson et al.

(10) Patent No.: US 7,210,791 B2
(45) Date of Patent: May 1, 2007

(54) SYSTEM AND METHOD FOR PROJECTOR EXTERNAL HAZARD PROXIMITY PROTECTION

(75) Inventors: Gregory Vinson, Round Rock, TX (US); Shirley R. Shaw, Austin, TX (US); Harold Thomas, Cedar Park, TX (US); Thomas Lee Yandell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 10/979,008

(22) Filed: Nov. 1, 2004

(65) Prior Publication Data

US 2006/0092383 A1 May 4, 2006

(51) Int. Cl.
 *G03B 21/00* (2006.01)
 *G03B 21/16* (2006.01)
(52) U.S. Cl. .......................... 353/69; 353/52
(58) Field of Classification Search ............ 353/52, 353/69, 85, 59
 See application file for complete search history.

(56) References Cited

U.S. PATENT DOCUMENTS

| | | | |
|---|---|---|---|
| 4,406,530 A * | 9/1983 | Hasegawa et al. ............ 353/66 |
| 5,489,954 A | 2/1996 | Field, Jr. ..................... 353/119 |
| 5,842,761 A | 12/1998 | Futakami et al. ........... 353/119 |
| 6,558,004 B2 | 5/2003 | Ito et al. ....................... 353/57 |
| 6,637,893 B2 * | 10/2003 | Hecht ............................ 353/85 |
| 6,827,453 B2 | 12/2004 | D'Alessio et al. ............ 353/85 |
| 2003/0038928 A1 * | 2/2003 | Alden ........................ 353/122 |
| 2005/0109333 A1 * | 5/2005 | Thomas ........................ 126/42 |
| 2005/0195372 A1 * | 9/2005 | Ohara .......................... 353/69 |

* cited by examiner

*Primary Examiner*—Rodney Fuller
(74) *Attorney, Agent, or Firm*—Hamilton & Terrile, LLP; Robert W. Holland

(57) ABSTRACT

A proximity sensor disposed in an information handling system projector detects external hazards to the operation of the projector to allow corrective action that addresses the hazard. For instance, an RF, IR or reflective sensor located proximate the projector lens detects an object positioned to block illumination from the lens. Objects that block illumination at a location proximate the focal point of the lens present a fire or overheating hazard that results in corrective action, such as dimming the projector lamp, powering down the projector lamp, playing an audible warning and displaying a visible warning.

17 Claims, 2 Drawing Sheets

SYSTEM AND METHOD FOR PROJECTOR EXTERNAL HAZARD PROXIMITY PROTECTION

BACKGROUND OF THE INVENTION

1. Field of the Invention

The present invention relates in general to the field of information handling system projectors, and more particularly to a system and method for a projector proximity protection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to display, communicate, print or otherwise process information. For instance, information handling systems are often used to display information through a projector. One example of information displayed by projectors is the presentation of information as a slide show before a large group of people, such as for business or education presentations. Another example of information displayed by projectors is the presentation of movies of television signals in a home for entertainment, such as showing DVD movies on a screen in a living room. Projectors typically display information by illuminating a relatively small image with a relatively bright lamp through a lens that projects a viewable image on a screen. In order to project an image with adequate size and brightness, information handling system projector lamps typically use powerful lamps, such as halogen arc lamps, that also generate tremendous amounts of heat. Often, projectors include thermal protection circuitry that will shut down the projector if the heat generated by the lamp becomes so excessive that physical damage to the projector is threatened.

Although thermal protection circuitry will shut down an overheating projector if the projector's internal temperature becomes excessive, the heat and light energy output by a projector lamp also presents a thermal hazard external to the projector. For instance, a projector lens focuses lamp energy through a focal point in order to project an image a desired distance. At the focal point, the projector lamp's output is concentrated in a very small area, similar to the concentration produced by a magnifying glass in sunlight, which quickly builds heat on objects near the focal point. Thus, an object placed in a projector lamp's path at or near the focal point of the projector's lens is typically subjected to a substantial amount of heat energy in a relatively small and focused area. The lamp's focused energy against an object tends to quickly produce high temperatures that present a fire hazard. For instance, a piece of paper held in a typical projector lamp's path often begins to smolder and burn in as little as a minute. If a user inadvertently points a projector lamp at an object without monitoring the projector, a fire hazard may result. In some instances, a user intentionally blocks a projector lamp with an object, such as a piece of paper, to temporarily block illumination from the projector during a presentation. As projector lamps continue to output greater and greater brightness, users who block lamp output with paper may see content on the paper discolored or burned in less and less time.

SUMMARY OF THE INVENTION

Therefore a need has arisen for a system and method which detects external objects placed within a predetermined proximity of a projector lamp and/or lens to reduce thermal hazards associated with light projected from the lamp.

In accordance with the present invention, a system and method are provided which substantially reduce the disadvantages and problems associated with previous methods and systems for monitoring projector lamp thermal hazards. A proximity sensor detects objects proximate but external to a projector that present a potential hazard, such as objects placed in the illumination output by a projector, to allow the projector to take corrective action that reduces the risk of the hazard.

More specifically, a proximity sensor disposed on a projector near the projector lens detects objects within a predetermined distance of the focal point of the lens. For instance, an RF sensor, IR sensor or reflective light sensor detects objects in the illumination path of the lens out to a predetermined distance associated with the lens focal point during normal focused use of the projector. Upon detection of the object, the proximity sensor communicates the detected object as a potential hazard to the processing components of the projector, such as microprocessor, to initiate corrective action. In one embodiment, the thermal protection circuitry dims or completely shuts down the lamp of the projector. In alternative embodiments, the processing components present an audible or visible warning before shutting down the lamp, such as a warning tone, a written message or a message presented in alternating colors that an external hazard is present.

The present invention provides a number of important technical advantages. One example of an important technical advantage is that external thermal hazards are monitored and managed to reduce the risk of projector operation. For instance, monitoring for objects within a predetermined distance of the lamp lens focal point allows timely elimination of an over temperature hazard, such as by dimming the illumination from the lamp until the hazard is resolved. Disruption of projector operations is minimized by providing an audible or projected warning before the reduction of illumination.

BRIEF DESCRIPTION OF THE DRAWINGS

The present invention may be better understood, and its numerous objects, features and advantages made apparent to those skilled in the art by referencing the accompanying

DETAILED DESCRIPTION

External hazards to an information handling system projector are detected with a proximity sensor to allow corrective action before the projector is damaged. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
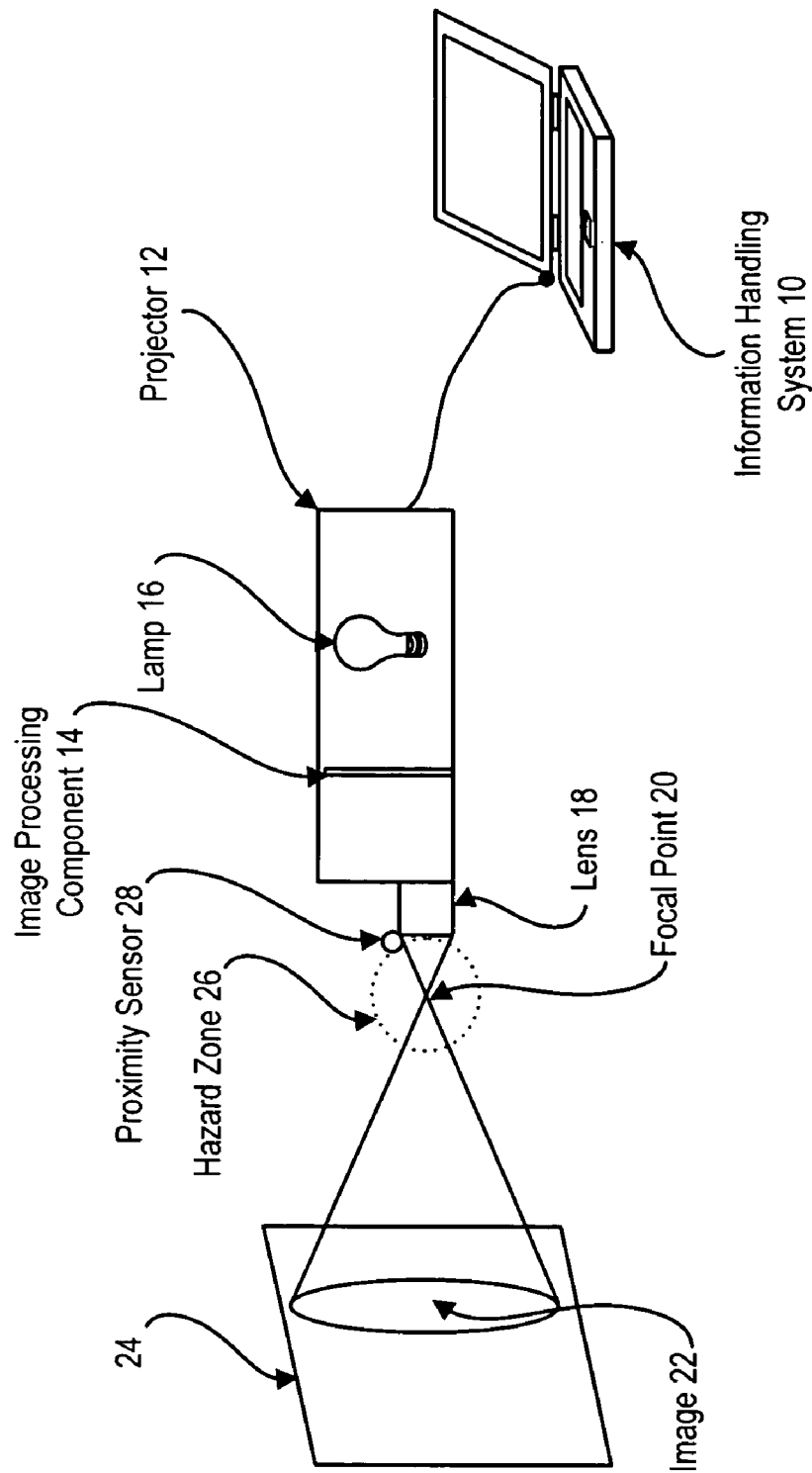
FIG. 1 depicts an information handling system projector having external hazard proximity protection.

Referring now to FIG. 1, an information handling system projector having a proximity sensor for protecting against external hazards is depicted interfaced with an information handling system 10. Information handling system 10 generates information for display, such as graphics, and communicates the display information to projector 12. Projector 12 forms images from the display information with an image processing component 14, such as an LCD panel or DLP, and illuminates the images with a lamp 16. The illuminated image passes through a lens 18, which focuses the image through a focal point 20 for presentation of a displayed image 22 on a distal screen 24. Lamp 16 displays the image at an adequate distance by producing bright light that generates heat energy on absorption at physical objects.

Heat generated by lamp 16 is most intense at focal point 20 where the light is concentrated in the smallest square area. A hazard zone 26 exists within a predetermined distance of focal point 20 due to the intense heat that can result if an object is placed in the path of the light illuminating from lens 18 as the light concentrates at focal point 20. In order to detect objects that come within hazard zone 26, a proximity sensor 28 is disposed at the outer housing of projector 12 near lens 18. Proximity sensor 28 detects objects within hazard zone 26 by outputting predetermined electromagnetic energy, such as infrared (IR) or radiofrequency (RF) energy, and detecting reflection of the outputted electromagnetic energy if an object is placed in hazard zone 26. Alternatively, proximity sensor 28 detects energy output by lamp 16 that is reflected from an object placed in the path of light from lens 18. Whether one or more of an RF, IR or reflective proximity sensor 28 is used, the sensitivity of the sensor is adjusted so that objects are detected that are distal projector 12, i.e., not touching projector 12, and within hazard zone 26, i.e., a predetermined distance of focal point 20. In a typical use, focal point 20 falls within two to three inches of lens 18. If an object is detected within hazard zone 26, projector 12 initiates predetermined corrective action. In one embodiment, once the object is removed from hazard zone 26, proximity sensor 28 detects that hazard zone 26 is free of the object to allow projector 12 to remove the corrective action and restore normal operations. For instance, an example of a corrective action is powering down lamp 16 on detection of an object in hazard zone 26, and the corrective action is reversed on detection of removal of the object by re-powering lamp 16.

Figure 2:
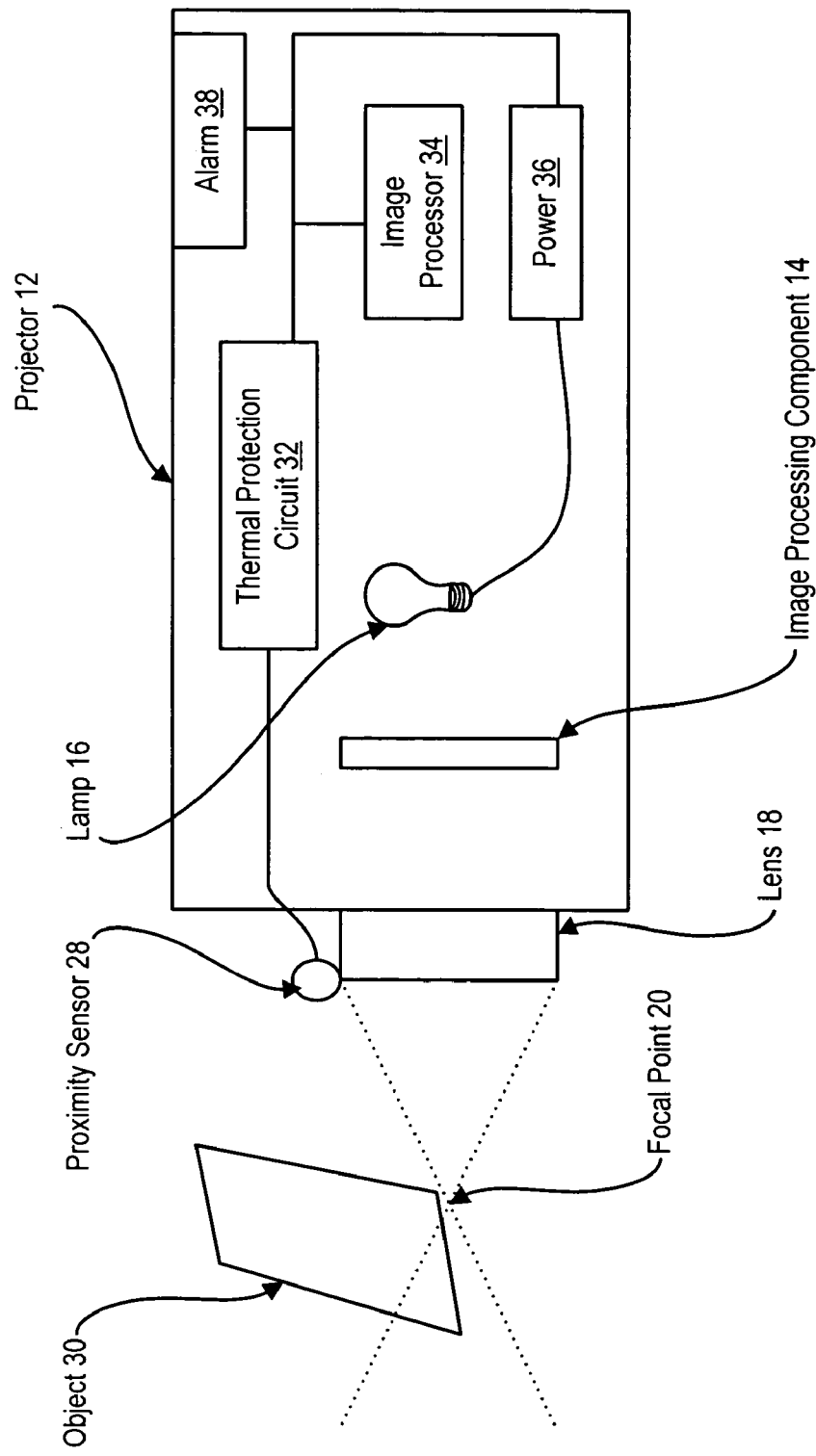
FIG. 2 depicts a block diagram of an information handling system projector having external hazard proximity protection.

Referring now to FIG. 2, a block diagram depicts a projector 12 having a proximity sensor 28 and configured to take corrective action if an object 30 is detected near focal point 20. Proximity sensor 28 signals detection of an object to thermal protection circuit 32, which typically shuts down power 36 to lamp 16 if the internal temperature of projector 12 exceeds a predetermined threshold. Thermal protection circuit 32 initiates corrective action to detection of an object by proximity sensor 28 that presents a hazard, such as after the object has been detected within the predetermined distance of focal point 20 for a time period in which excessive heat could build-up at the object. One corrective action initiated by thermal protection circuit 32 is to shut down power 36 to lamp 16 so that heat no longer builds up at object 30 due to illumination from lamp 16. However, a full shut down of power 36 due to an external object 30 may be considered an overly-aggressive corrective action where the heat build-up at object 30 is gradual. Thus, prior to shutting down power 36, thermal protection circuit 32 may be configured to provide a visual or audible warning. For instance, thermal protection circuit 32 communicates detection of object 30 to image processor 34 for display of a warning message by image processing component 14. In one embodiment, the warning message includes display of alternating bright colors to catch a user's attention in the event that images from projector 12 are not readable due to object 30. Audible warnings are presented by an alarm 38 interfaced with thermal protection circuit 32. The timing and length of visual and audible warnings are configurable based on a variety of factors, including the energy output by lamp 16, the position of the object in the hazard zone and the potential inconvenience to users who may intermittently block the light path from lens 18 either unintentionally or as part of normal use of projector 12 during a presentation.

Although the present invention has been described in detail, it should be understood that various changes, substitutions and alterations can be made hereto without departing from the spirit and scope of the invention as defined by the appended claims.

What is claimed is:

1. An information handling system projector comprising:

a housing;

processing components disposed in the housing and operable to process information for display;

a lamp interfaced with the processing components and operable to illuminate the information for display;

a lens extending from proximate the lamp to the housing and operable to focus the illuminated information through a focal point external to the housing for display of the information distal the housing; and a proximity sensor interfaced with the processing components, the proximity sensor operable to detect an object proximate the focal point;

wherein the processing components perform predetermined corrective actions if the proximity sensor detects an object proximate the focal point.

2. The information handling system projector of claim 1 wherein the proximity sensor comprises an RF sensor disposed proximate the lens.

3. The information handling system projector of claim 1 wherein the proximity sensor comprises an IR sensor disposed proximate the lens.

4. The information handling system projector of claim 1 wherein the proximity sensor comprises a reflective light sensor.

5. The information handling system projector of claim 1 wherein the corrective action is dimming of the illumination from the lamp.

6. The information handling system projector of claim 1 wherein the corrective action is sounding an audible alarm.

7. The information handling system projector of claim 6 wherein the corrective action further comprises powering off the lamp a predetermined time after the alarm sounds.

8. The information handling system projector of claim 6 wherein the corrective action further comprises resetting the focal point.

9. The information handling system projector of claim 6 wherein the corrective action further comprises generating a warning with the processing components and illuminating the warning with the lamp.

10. A method for protecting a projector from an external hazard, the method comprising:
displaying information from the projector with a lamp through a lens, the lens having a focal point;
detecting an object blocking the display through the lens, the object within a predetermined distance of the focal point, the focal point external to and distal from the projector; and
altering the operation of the projector in a predetermined manner to reduce the risk that the object will present a hazard to the projector, the predetermined manner comprising generating an audible alarm.

11. The method of claim 10 wherein detecting an object further comprises detecting an object with an RF sensor.

12. The method of claim 10 wherein detecting an object further comprises detecting an object with an IR sensor.

13. The method of claim 10 wherein detecting an object further comprises detecting an object with light reflected from the object.

14. A method for protecting a projector from an external hazard, the method comprising:
displaying information from the projector with a lamp through a lens, the lens having a focal point;
detecting an object blocking the display through the lens, the object within a predetermined distance of the focal point, the focal point external to and distal from the projector; and
altering the operation of the projector in a predetermined manner to reduce the risk that the object will present a hazard to the projector, the predetermined manner comprising dimming the lamp.

15. A method for protecting a projector from an external hazard, the method comprising:
displaying information from the projector with a lamp through a lens, the lens having a focal point;
detecting an object blocking the display through the lens, the object within a predetermined distance of the focal point, the focal point external to and distal from the projector; and
altering the operation of the projector in a predetermined manner to reduce the risk that the object will present a hazard to the projector, the predetermined manner comprising powering down the lamp.

16. A method for protecting a projector from an external hazard, the method comprising:
displaying information from the projector with a lamp through a lens, the lens having a focal point;
detecting an object blocking the display through the lens, the object within a predetermined distance of the focal point, the focal point external to and distal from the projector; and
altering the operation of the projector in a predetermined manner to reduce the risk that the object will present a hazard to the projector, the predetermined manner comprising displaying a warning with the projector.

17. The method of claim 16 wherein displaying a warning comprises displaying alternating colors.

* * * * *